March 21, 1950 — N. A. NILSSON — 2,501,288
APPARATUS FOR MAKING HELICAL SHAPED CANDIES
Filed July 16, 1946
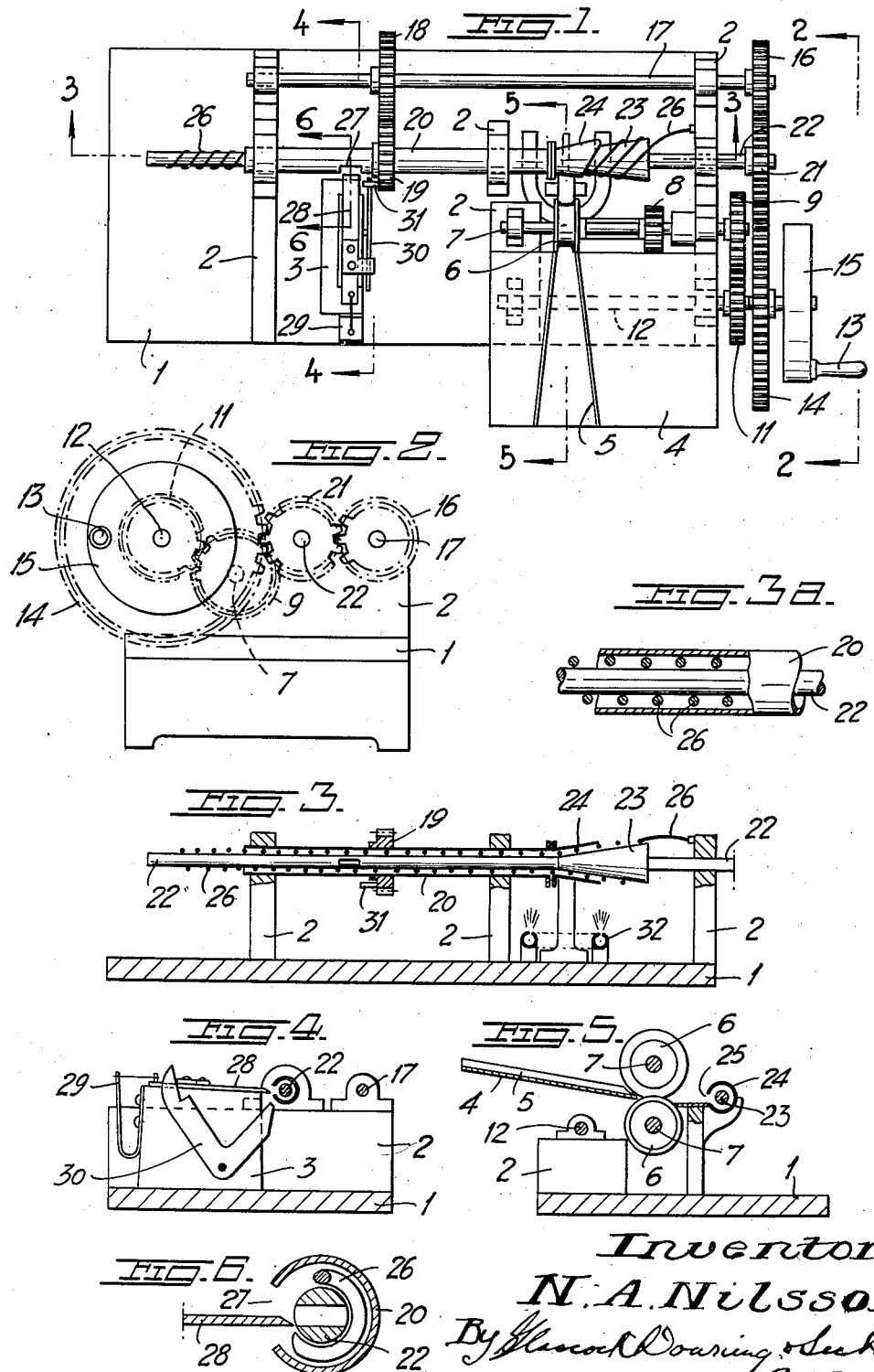
Inventor
N. A. Nilsson
By [signature] Attys Patented Mar. 21, 1950

2,501,288

UNITED STATES PATENT OFFICE 2,501,288

APPARATUS FOR MAKING HELICAL SHAPED CANDIES

Nils Adolf Nilsson, Gavle, Sweden

Application July 16, 1946, Serial No. 684,026
In Sweden July 20, 1945

4 Claims. (Cl. 107—8)

The present invention relates to an improved machine for making such candies and the like, which are wound or twisted in a helical or screw-like shape. In machines of this type the candy paste or the like generally is brought to a pair of feeding rollers in order to be fed by these into a conveyor and then be brought along to a place, where portions of a determined size of a paste string are cut off, said paste string having been formed into a helical or screwlike shape during the feed.

The machine according to the present invention is substantially characterized by the feature that the conveyor comprises a stationary receiving hopper or the like, a rotating shaft extending through it, a stationary helical member surrounding said shaft, and a rotating sleeve forming a continuation of said hopper, said sleeve concentrically surrounding the helical member and a part of the shaft so that a helical channel is formed between the windings of said member, in which channel the candy paste is fed owing to the rotation of said shaft and said sleeve.

An embodiment of the machine according to the present invention is diagrammatically set forth in the accompanying drawing, in which Fig. 1 is a view of the machine from above;

Fig. 2 is an end elevation, viewed in the direction of the arrows, extending from the line 2—2 in Fig. 1;

Fig. 3 is a longitudinal section along the line 3—3 in Fig. 1;

Fig. 3a is a longitudinal section of a detail on a greater scale relating to Fig. 3;

Fig. 4 is a cross section along the line 4—4 in Fig. 1;

Fig. 5 is another cross section along the line 5—5 in Fig. 1; and

Fig. 6 shows a section of a detail along the line 6—6 in Fig. 1 on a greater scale.

The different parts of the machine are mounted on a plate 1 or the like. Thus, the plate 1 supports bearing supports 2 for the shafts of the machine as well as a bracket 3 for the cutting device and a table 4. On said table is provided a receiving groove 5 or the like, in which the candy paste is placed in order to be brought to a pair of feeding rollers 6, which are mounted on shafts 7. One of the rollers 6 is at its ends provided with collars or the like so that the candy paste as fed by the rollers is shaped into a strip or string. On the shafts 7 are secured pinions 8, being in mesh with each other so that the rollers rotate in the same direction, when one of the shafts 7 is rotated. On this latter shaft is secured a gear 9, which engages a gear 11, fixed on a driving shaft 12. Said shaft 12 is provided with a driving wheel 15, which may be operated by belt drive or manually by means of the crank 13. On the shaft 12 besides the gear 11 is mounted another gear 14, which engages a gear 21, fixed on the shaft 22. The gear 21 drives in turn a gear 16, mounted on a shaft 17, on which is also secured a gear 18, being in mesh with another gear 19, which is mounted on a sleeve 20, the object of which will be more fully described hereinafter.

The shaft 22 extends through said sleeve 20 and is provided with or has an integral tapered portion 23, which extends into a hopper 24, supported on the plate 1 in any suitable way. The sleeve is rotatable relative to said hopper, this in turn being stationary and provided with a lateral aperture 25 (see Fig. 5), which is located substantially in front of the contact point of the rollers 6 so that a candy string being fed by the rollers is pushed through said aperture 25. Around the tapered portion and a part of the shaft is placed a coil- or screwlike metal wire 26 or the like, which is attached on a suitable support, for instance on one of the bearing supports 2, in order to make said wire stationary or practically stationary.

The hopper 24 is suitably soldered to the metal wire 26, which extends both through the hopper 24 and the sleeve 20, the space between its windings substantially corresponding to the width of the candy string as it is fed by the rollers 6. The radial space between the sleeve 20 and the shaft 22 is substantially the same as the thickness of the candy string. The sleeve 20 is provided with a lateral aperture 27, which is located in the same vertical cross plane as a knife 28, appertaining to a cutting device as before mentioned. The knife 28 is movably mounted on the bracket 3 and actuated by a spring 29, which tends to keep the knife in a rear position. Besides the knife 28 is actuated by a pawl 30 or the like, which in turn is actuated by a tenon 31 secured to the gear 19 in order to push the knife forward so that its edge is periodically inserted into the aperture 27 and cuts off the candy string in the same moment as the opening passes the knife, which is then immediately drawn back by the spring 29. The shaft 22 is suitably provided with an opening corresponding to the aperture 27. Alternately an angular recess or the like may be cut in the shaft, the knife then co-operating with one side of said recess to secure a safe cutting off of the candy string. Under the sleeve 20 is provided a light or any other suitable heating device 34, by means of which the candy string is held at a suitable temperature in order to facilitate the forming of the string.

The machine operates in the following manner:

The candy paste is placed on the table 4 and brought to the rollers 6, which drive it on in the shape of a string, as soon as the crank 13 is rotated, since the rotating movement is transmitted to the rollers 6 by means of the gear 11, the gear 9 and pinions 8. The string being fed in this way, slides along over a bridge and is inserted into the opening 25 in the hopper 24 between the windings of the metal wire 26, where the string is entrained first by the tapered portion 23 and then by the shaft 22 and the sleeve 20, as a rotation is imparted to said elements by means of the gear 14, gears 16, 21, the shaft 17 and gears 18 and 19. The feeding on of the candy string within the helical channel provided between the windings of the metal wire is actuated by the friction of the rotating elements that is, said shaft and said sleeve and is performed in synchronism with the feeding of the string by the rollers 6, the metal wire obviously guiding the string in a helical or screwlike line. Obviously the friction power provided by the rotary movement of the shaft and that of the sleeve overcomes the retarding friction of the metal wire and thus the candy string will be fed forward through the helical channel. Each time the tenon 31 of the gear 19 impinges the pawl 30 the knife 29 is actuated so that it is inserted into the apertures 27 in the sleeve 20 exactly when said aperture passes the knife, which then cuts off the string. The cut off portion is driven along by the shaft 22 and followed by the next cut off portion and finally slides off said shaft. As will be easily understood, this process provides a quick and even making of the candies in question, which is of great importance in the art.

With regard to the construction the present invention is, of course, not limited to the embodiment as hereinbefore described but may be modified in many various ways without going beyond the scope of the invention. This refers especially to the driving means and those devices, which feed and form the candy helicoid. These latter devices provide a kind of a helicoid conveyor, the details of which may obviously be made in different ways. However, said conveyor as well as the cutting device ought always to operate in synchronism with the feeding rollers. Moreover, the bearings of the shaft 22 must be provided so that the shaft easily can be removed for the cleaning of the helicoid conveyor. At last, it will be obvious that the embodiment as hereinbefore described may be used for making other helical-shaped items than candies.

I claim:

1. In a machine for making in a helical or screwlike shape wound candies or the like, of the type in which the candy paste or the like is brought to a pair of feeding rollers in order to be fed by these into a conveyor and by means of the latter formed into a helical or screwlike shape, the combination of a conveyor comprising a stationary receiving hopper adapted to receive the candy paste from the feeding rollers, a rotating shaft extending through said hopper, a stationary helical member surrounding said shaft, and a rotating sleeve forming a continuation of said hopper, said sleeve concentrically surrounding the helical member and a part of the shaft so that a helical channel is formed between the windings of said member, in which channel the candy paste is fed owing to the rotation of said shaft and said sleeve.

2. Machine according to claim 1, in which the stationary member consists of a metal wire.

3. Machine according to claim 1, in which the rotating shaft is provided with a tapered portion, which fits in the hopper within the helical member.

4. Machine according to claim 8, in which the rotating sleeve is provided with an aperture, and a cutting member adapted to be introduced through the aperture when the aperture passes in front of said member for cutting off the candy string.

NILS ADOLF NILSSON.

REFERENCES CITED

The following references are of record in the file of this patent:

UNITED STATES PATENTS

| Number | Name | Date |
|---|---|---|
| 754,549 | Dietz | Mar. 15, 1904 |
| 1,190,134 | Embrey | July 4, 1916 |
| 1,218,340 | Torre | Mar. 6, 1917 |
| 1,958,144 | Hutchinson | May 8, 1934 |